(12) United States Patent
Elsasser et al.

(10) Patent No.: US 9,039,800 B2
(45) Date of Patent: May 26, 2015

(54) FILTER FOR A FLUID-CONDUCTING PIPE

(71) Applicant: Witzenmann GmbH, Pforzheim (DE)

(72) Inventors: Fabian Elsasser, Neulingen (DE);
Thomas Kunzmann, Pforzheim (DE);
Sebastian Reuss, Karlsbad (DE)

(73) Assignee: Witzenmann GmbH, Pforzheim (DE)

( * ) Notice: Subject to any disclaimer, the term of this patent is extended or adjusted under 35 U.S.C. 154(b) by 3 days.

(21) Appl. No.: 13/955,629

(22) Filed: Jul. 31, 2013

(65) Prior Publication Data
US 2014/0047807 A1    Feb. 20, 2014

(30) Foreign Application Priority Data

Aug. 16, 2012    (DE) .......................... 10 2012 214 609

(51) Int. Cl.
| | | |
|---|---|---|
| B01D 46/00 | (2006.01) | |
| B01D 39/20 | (2006.01) | |
| B01D 46/10 | (2006.01) | |
| B01D 39/10 | (2006.01) | |
| B01D 46/52 | (2006.01) | |
| B01D 39/12 | (2006.01) | |

(52) U.S. Cl.
CPC .............. *B01D 39/20* (2013.01); *B01D 46/103* (2013.01); *B01D 39/2041* (2013.01); *B01D 39/10* (2013.01); *B01D 39/2017* (2013.01); *B01D 46/0005* (2013.01); *B01D 46/10* (2013.01); *B01D 46/522* (2013.01); *B01D 2275/50* (2013.01); *B01D 39/12* (2013.01)

(58) Field of Classification Search
CPC .. B01D 39/20; B01D 39/2017; B01D 39/202; B01D 39/2027; B01D 39/2041; B01D 39/2044; B01D 46/0005; B01D 46/52; B01D 46/522; B01D 39/10; B01D 39/12; B01D 46/103; B01D 2275/50; F02M 35/02441; F02M 35/02466; F02M 35/02475; F02M 35/02485
USPC .................................... 55/505, 507, 525, 529
See application file for complete search history.

(56) References Cited

U.S. PATENT DOCUMENTS

| | | | | |
|---|---|---|---|---|
| 5,840,091 | A | * | 11/1998 | Strong .......................... 55/385.1 |
| 5,961,931 | A | * | 10/1999 | Ban et al. ....................... 422/171 |
| 6,991,668 | B2 | * | 1/2006 | Towsley ........................... 55/525 |
| 2008/0047242 | A1 | * | 2/2008 | Durocher et al. ............... 55/505 |

FOREIGN PATENT DOCUMENTS

| | | |
|---|---|---|
| DE | 102005028606 | 1/2007 |
| DE | 102009034085 | 1/2011 |
| DE | 102010050393 | 5/2012 |
| FR | 2930278 | 10/2009 |

* cited by examiner

*Primary Examiner* — Robert Clemente
(74) *Attorney, Agent, or Firm* — Volpe and Koenig, P.C.

(57) ABSTRACT

A filter for a fluid-conducting pipe, in particular for a gas-conducting pipe of an internal combustion engine. The filter includes a self-supporting areal filter element and is fixable along a circumference 2 directly or indirectly in the pipe and, in so doing, covers a free cross section of the pipe. Here, the circumference 2 of the filter element 1 circumscribes a central filter plane 4. Furthermore, the filter element 1 or at least one layer thereof is comprised of a plastically deformable material and is provided with at least one undulation 5 or bead 13, which does not intersect the circumference 2, in such a way that the filter element 1 intersects the filter plane 4, or a plane 4a parallel thereto, at least four times within the circumference 2.

15 Claims, 3 Drawing Sheets

FILTER FOR A FLUID-CONDUCTING PIPE

INCORPORATION BY REFERENCE

The following documents are incorporated herein by reference as if fully set forth: German Patent Application No. 102012214609.1, filed Aug. 16, 2012.

BACKGROUND

The invention relates to a filter for a fluid-conducting pipe, in particular for a gas-conducting pipe of an internal combustion engine.

A filter of the present type comprises a self-supporting areal filter element which may be of inherently stable, single-layer or multi-layer construction, or else may be comprised of a supporting structure which is permeable over its full area and which has seated thereon a filter layer which is not imperatively inherently stable. This filter element is, along its circumference, fixed directly or indirectly in the fluid-conducting pipe. Here, said filter element covers a free cross section of the pipe, wherein its circumference circumscribes a central filter plane.

The preferred field of use of a filter of the present type is a gas-conducting pipe of an internal combustion engine, specifically a line for exhaust-gas recirculation for the reduction of the emissions of nitrogen oxides that are generated during the combustion of fuel in Otto-cycle engines, diesel engines, gas turbines, heating boilers, etc. The thermal loads in the fluid-conducting pipe in which the filter is to be used are correspondingly high.

In the case of external exhaust-gas recirculation, which is obligatory in particular in motor vehicle internal combustion engines owing to the stringent exhaust gas regulations, the exhaust tract and the intake tract of the engine are connected by a line. This line may run in the cylinder head or may be a separate line outside the engine block. If the air inducted by the internal combustion engine is, in this way, admixed to the exhaust gas, the oxygen concentration of the mixture supplied to the engine decreases, which lowers the combustion temperature in the cylinders of the engine. Since the formation of nitrogen oxides is highly temperature-dependent, the nitrogen oxide formation can be reduced in this way. To increase the efficiency of this process, the recirculated exhaust gas must however be supplied at as cool a temperature as possible to the intake tract, which may be realized through active cooling of the recirculated exhaust-gas flow or by means of an extraction of the exhaust gas to be recirculated at a point of the exhaust system situated further downstream, at which the exhaust-gas temperatures have already decreased to a considerable extent.

In particular in the case of modern diesel engines, it is conventional to use hybrid exhaust-gas recirculation systems in which a part of the exhaust gas is extracted for recirculation close to the engine (high-pressure exhaust-gas recirculation), and a part is extracted downstream of the catalytic converter or diesel particle filter (low-pressure exhaust-gas recirculation).

It is a problem here that, via the low-pressure exhaust-gas recirculation, ceramic particles of the catalytic converter or diesel particle filter can pass into the intake tract of the engine. Furthermore, via the high-pressure exhaust-gas recirculation line, soot particles can be transported into the intake tract. Ceramic particles can cause damage to the moving components of the engine, in particular to the compressor wheel of the turbocharger that is normally provided. Also, however, soot particles in the recirculated exhaust-gas flow can damage a turbocharger or other components such as a cooler for the recirculated exhaust-gas flow, because the soot particles act as condensation nuclei and initiate the formation of condensate. The condensate which forms then leads to so-called varnishing of the components.

In exhaust-gas recirculation systems of internal combustion engines, it is therefore essential to filter the recirculated exhaust-gas flow. This is realized in the prior art by a filter element which is comprised substantially of a metal nonwoven. In particular due to the thermal loading of the filter, inserting the filter into the fluid-conducting pipe such that it is permanently and functionally fixed is not without problems.

Previous solutions, for example according to DE-A-10 2010 050 393, use for this purpose a pipe connector with a cover which is provided with a particular hole pattern for the passage of the fluid to be filtered. The filter element is positioned on said cover and fixed by a second cover which has an identical hole pattern to the first cover and which is oriented in alignment therewith. The filter element is enclosed between the first and the second cover, such that the fluid which flows through the holes in the two covers must pass through the filter element and be filtered there. The first and the second cover are fixed to one another by a welded connection.

The manufacture of a filter of this type according to the prior art, and the installation in particular in an exhaust-gas recirculation line of an internal combustion engine, are disadvantageously cumbersome due to the necessary exact orientation of the components with respect to one another and in particular owing to the necessary welding. Furthermore, the weldability of the components demands a minimum wall thickness thereof, which keeps the material costs high. Finally, in the preferred field of use in a gas-conducting pipe of an internal combustion engine, problems arise as a result of the high thermal loading of the filter, because the hole patterns of the two covers that are used are self-evidently provided with very narrow webs between the holes so as not to hinder the fluid flow to any great extent, which webs are accordingly susceptible to hot cracking.

It is pointed out at this juncture that the present invention is not restricted to filters for use in gas-conducting pipes of internal combustion engines, even though this is the preferred use and the above-described prior art was the starting point for the considerations relating to the invention. Other uses of filters for insertion into fluid-conducting pipes present similar problems.

SUMMARY

The present invention is based on the objective of improving a filter of the type specified in the introduction such that it is possible to dispense with the hitherto conventional retaining structure with a cover which bears the filter element and has a hole pattern, without the thermomechanical load capacity of the filter being significantly impaired.

This objective is met by a filter having one or more features of the invention. Preferred embodiments and refinements of the filter according to the invention are specified below and in the claims.

According to the present invention, a filter of the type specified in the introduction is thus manufactured so as not to have a cover with hole pattern and webs or any other stable but shadow-forming retaining structures. The filter element, which as mentioned in the introduction is inherently stable or may also be formed from a filter layer on a supporting structure which itself is permeable, is rather fixed by way of its circumference in the pipe in a self-supporting manner. This may be realized directly or else indirectly, for example via a carrier pipe, a sleeve or the like. This firstly yields advantages with regard to the usable line cross section, because no shadows are formed by supporting webs and the like. Further advantages arise in particular in the preferred field of use of the present invention, in an exhaust-gas recirculation system of an internal combustion engine. This is because, if soot particles accumulate on the filter fabric, which soot particles accumulate over the course of time to form a filter cake, the self-supporting arrangement of the filter element makes it possible for the filter cake to be depleted again by high exhaust-gas temperatures during the regeneration of a particle filter generally arranged upstream. A filter which, according to prior art, is provided with a shadow-forming retaining structure or a cover with openings and retaining webs connecting these is, by contrast, scarcely capable of eliminating retained soot particles, which form a filter cake, during a regeneration of the particle filter or as a result of high exhaust-gas temperatures. This is because the webs of the cover conduct the heat out of the filter element particularly quickly into the pipe, in particular if, as is conventional in a high-pressure exhaust-gas recirculation line, said pipe houses a cooler.

The present invention is based on the realization that a filter element, even if it is not comprised of an inherently stable, self-supporting filter material but rather is supported by a supporting structure which is permeable over its full area, can, in a filter of the present type, be of self-supporting construction only if additional measures are implemented for increasing the thermomechanical durability. This is because, in many applications, in particular in the present particularly preferred field of use in an exhaust-gas recirculation line of an internal combustion engine, the filter must withstand cyclic temperature fluctuations between ambient temperature (which in winter may lie considerably below 0° C.) and operating temperature, and if appropriate regeneration temperature of approximately 650° C. to 950° C. In addition to the temperature loading there is the mechanical loading resulting from a differential pressure of typically at least 80 mbar up to typically 300 mbar. Thermal expansion effects could lead to a change in the filter fineness or even to distortion up to the point of failure of the filter.

According to the invention, therefore, it is proposed, for thermomechanical stabilization, that the filter element and/or a layer thereof, for example a supporting structure for a filter layer which is not inherently stable, be manufactured from a plastically deformable material and provided with at least one undulation or bead, which does not intersect the circumference, in such a way that the filter element intersects the filter plane, or a plane parallel thereto, at least four times within the circumference.

This means that the filter element, along a section line extending through the central point thereof, undulates in two directions, that is to say is not only for example convexly or concavely curved. It is important here that the circumference of the filter element remains uninfluenced by the undulation or bead, because the latter runs within the circumference and preferably substantially along a curve parallel to the circumference. The shape of a loudspeaker diaphragm may for example be formed in this way. If appropriate, the undulation or bead may also be composed of multiple partial segments spaced apart from one another, for example in the form of a segmented undulation.

The undulation or bead which is formed, preferably stamped, into the filter element ensures that thermal expansion effects can be compensated at said undulation or bead, such that no excessive stresses arise in the material even in the event of high thermomechanical loading. This is of particular importance for example if, as is preferable within the context of the present invention, the filter element is produced at least partially from metal wires which have different wire thicknesses, wherein in particular, warp wires of a metal mesh may be formed so as to be thicker than weft wires.

The thermomechanical stabilization of the filter element according to the invention advantageously has the effect that, on the circumference, only one clamping ring for non-positively locking or positively locking fixing to the fluid-conducting pipe is sufficient for the filter to be of permanently stable construction.

The undulation or bead according to the invention, or multiple undulations or beads, are preferably of rotationally symmetrical or point-symmetrical form, and preferably adapted to the symmetry of the cross section of the fluid-conducting pipe. This optimizes the thermal-expansion-compensating characteristic of the undulations or beads.

The filter element preferably has multiple concentric undulations or beads with identical or different heights, and centrally, a flattening or spherical-cap-shaped elevation or depression. Here, the undulations or beads may be stamped in a continuous or irregular form.

The filter element may be formed, for example, as a grooved diaphragm disk with a bulge-like ring at the outside and, at the inside, a conical elevation or spherical cap, or else a partially flat base.

Within the context of the present invention, the filter element is preferably composed at least in part of heat-resistant high-grade steel, in particular from austenitic high-grade steel, because this is more easily deformable than ferritic high-grade steel.

The filter element or the filtering layer thereof may be comprised of a fabric, of a fine fabric, of a knitted fabric with in particular rectangular meshes or square meshes, of a knit, of a sintered fabric and/or of a braided fabric or the like, wherein the filter fineness is at least 500 µm; the filter fineness is preferably at least 200 µm.

Within the context of the present invention, the filter element should be configured such that, in the installed state and at a temperature of up to 650° C., preferably up to 750° C., more preferably up to 950° C., it withstands a differential pressure without permanent deformation.

Within the context of the present invention, the filter element, in the installed state, should furthermore preferably withstand a maximum force of at least 100 N, preferably of at least 200 N, more preferably of at least 600 N without rupturing, said maximum force acting perpendicular to the filter plane over at least two thirds of the overall area of the filter element.

Within the context of the present invention, the filter element may be fixed to a carrier pipe such as is known per se and cover the clear internal cross section thereof. Such a carrier pipe may be of cylindrical, oval, polygonal, rectangular or square shape. The filter element is then, at its circumference, preferably bent to form a circumferential region running parallel to the wall of the carrier pipe. The fixing to the carrier pipe then takes place via a sleeve which clamps the circumferential region of the filter element between itself and the carrier pipe. It is preferable here for the filter element to be compressed between the sleeve and the carrier pipe, such that no leakage path can be generated adjacent to the filter element.

If a carrier pipe and a sleeve are used for receiving the filter element, it is preferable for the carrier pipe and the sleeve to be provided with at least one aligned outflow opening, for example for the purpose of discharging condensate and/or to permit a visual inspection during the assembly of the filter.

Said outflow opening is covered by the filter element, such that no leakage path is formed here either.

For a further increase in thermomechanical stability, the filter element, which is preferably at least partially composed of a fabric, a knitted fabric or a knit, may have special structures and a suitable selection of the wire diameter, for example different diameters of warp and weft wires or multilayer, different fabric or knit forms, which may also be sintered with one another or coated.

BRIEF DESCRIPTION OF THE DRAWINGS

A plurality of exemplary embodiments of a filter designed according to the invention will be described and explained on the basis of the appended drawings, in which.

DETAILED DESCRIPTION OF THE PREFERRED EMBODIMENTS

Figure 1:
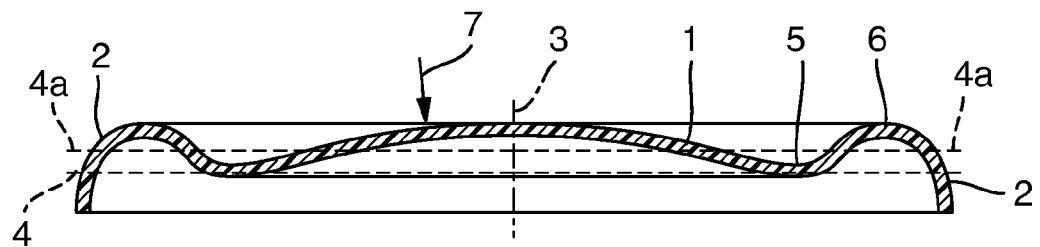
FIG. 1 is a schematic, side-on sectional illustration of a first exemplary embodiment of a filter.

FIG. 1 shows a filter, designed according to the invention, in a schematic, side-on sectional illustration. This filter is composed of a filter element 1 which is of self-supporting design and which, at a circumference 2, can be fixed in a pipe (not illustrated here). Said filter element 1 is formed so as to be circular and rotationally symmetrical about a central point 3. It is comprised of a filter fabric comprised of austenitic high-grade steel wires with a filter fineness of approximately 200 µm.

The circumference 2 of the filter element 1 circumscribes a central filter plane 4 which has a plane 4a parallel to said filter plane 4 and which is intersected four times by the filter element. The central region of the filter element 1 has the shape of a spherical cap, wherein the latter however does not extend as far as the circumference 2 but rather terminates in an undulation 5 which is connected to the circumference 2 via a bulge-like ring 6. Primarily as a result of the undulation 5 and the associated double bend of the filter element 1 relative to the filter plane 4, the filter element 1 exhibits particularly high thermomechanical durability, because heat-induced expansions and changes in length of the spherical-cap-shaped central region of the filter element are compensated by the undulation 5.

The arrow 7 symbolizes the flow direction of the fluid to be filtered. The spherical bulge of the inner region of the filter element 1 serves to provide high mechanical stability with respect to the fluid flow.

Figure 2:
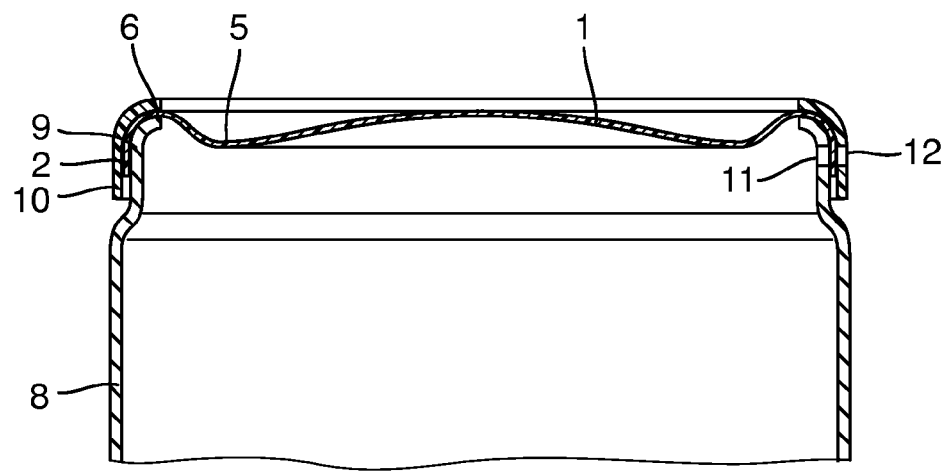
FIG. 2 is a side-on, schematic sectional illustration of the filter from FIG. 1 in its installation situation.

FIG. 2 shows the filter element 1 from FIG. 1 in a state in which it is inserted into a carrier pipe 8 for insertion into an exhaust-gas recirculation line of a diesel engine. Here, the filter element 1 is seated on the carrier pipe 8 by virtue of the circumference 2 of the filter element 1 covering an inwardly drawn pipe connector 9 of the carrier pipe 8. Mounted on the pipe connector 9 is a sleeve 10 which is in the form of a clamping ring and which clamps the circumference 2 of the filter element 1 between itself and the pipe connector 9 but leaves the clear internal cross section of the pipe connector 9 completely free.

The metal fabric of the filter element 1 additionally covers a lateral outflow opening 11 provided in the pipe connector 9 of the carrier pipe 8, said outflow opening being aligned with an outflow opening 12 in the sleeve 10. By virtue of the fact that the filter element 1 covers the two outflow openings 11, 12, no leakage path for the gas flow to be filtered can arise here. At the same time, through the outflow opening 12, a visual inspection may be performed as to whether the filter element 1 has been correctly compressed between the pipe connector 9 and the sleeve 10.

The sleeve 10 is placed in a clamping manner onto the pipe connector 9 or onto the circumference 2 of the filter element 1 in such a way that the filter element 1 is compressed at its circumference 2. This, too, prevents any leakage paths from forming.

The exemplary embodiments illustrated in the drawings for a filter according to the invention are intended for use in an exhaust-gas recirculation line of a diesel engine. The filter fabric of the filter element 1 has a special shaping such that any filter cake formed by retained soot particles from the exhaust-gas flow is built up in a certain time period which permits a layer thickness of for example 0.01 mm to 2 mm partially with a maximum pressure increase of 100 mbar, and said filter cake is depleted again during a regeneration cycle, such that a pressure loss across the filter element 1 is attained which corresponds to the initial state. Here, "initial state" refers to a state which is assumed after for example 5 to 10 regeneration cycles. Here, depending on the engine specification, the regeneration temperature which acts on the filter element 1 is approximately 750° C., and may also lie in the range from 650° C. to 950° C.

Figure 3:
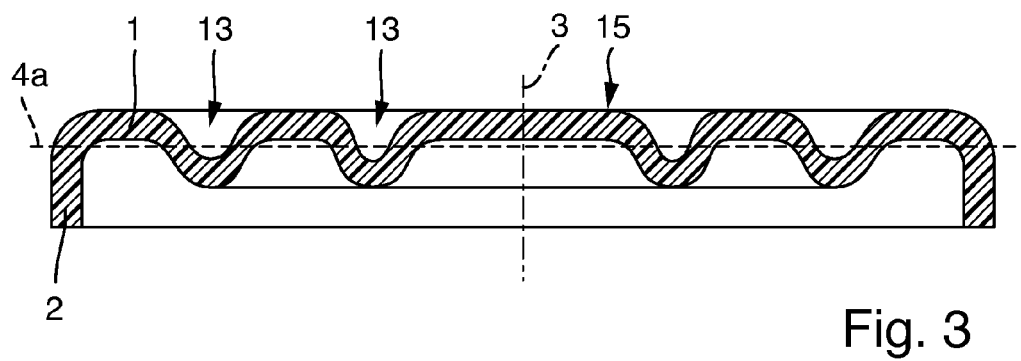
FIG. 3 is a schematic, side-on sectional illustration of a second exemplary embodiment of a filter.
Figure 4:
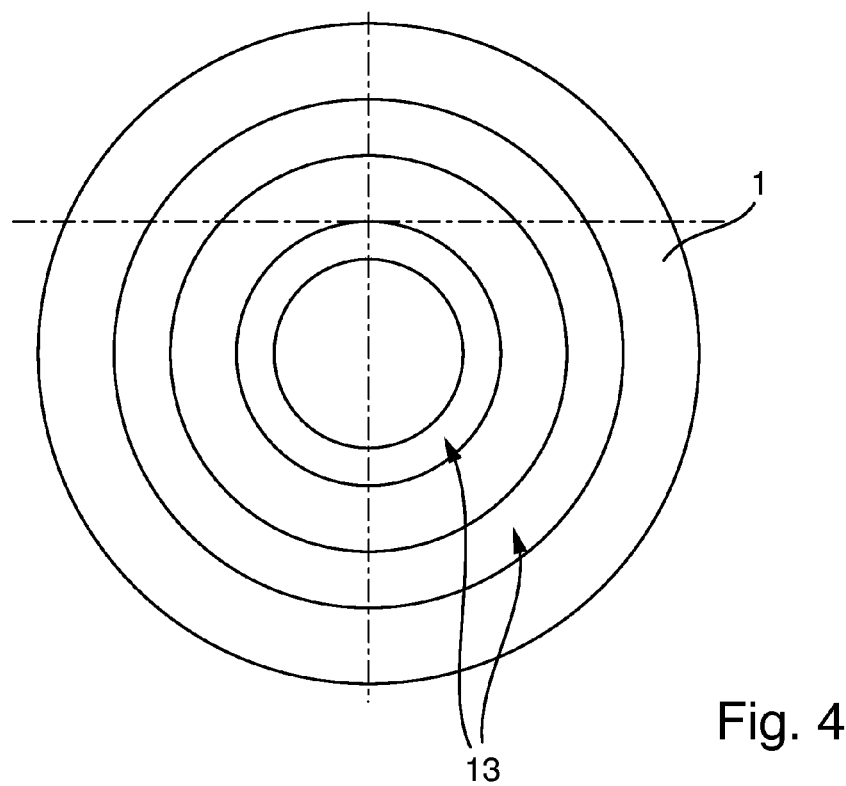
FIG. 4 is a plan view of the filter from FIG. 3.
Figure 5:
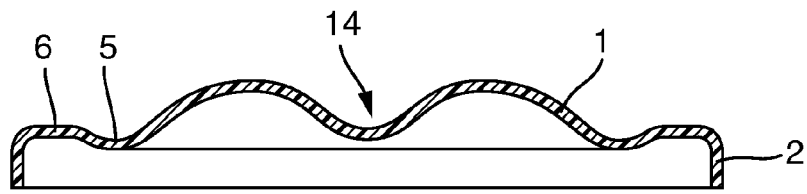
FIGS. 5 to 9 are schematic, side-on sectional illustrations of further exemplary embodiments of a filter.

FIGS. 3 and 4 show, in a schematic, side-on sectional illustration and in a plan view, a second exemplary embodiment for a filter element 1 designed according to the invention. This filter element 1 is again of circular form as seen in plan view, and is of substantially flat form with two concentrically stamped-in beads 13. The beads 13 have the effect that a plane 4a parallel to the filter plane 4 is intersected more than four times, and hereby ensure that thermal expansion effects under thermomechanical loading are substantially compensated within the beads 13.

FIGS. 5 to 9 show further possible forms of a filter element 1, which fall within the scope of the present invention, in a side-on, schematic sectional illustration. The filter element 1 in FIG. 5 again has a bulge-like edge 6 which is connected via an annular undulation 5 to a substantially convexly bulged inner region of the filter element 1. In the center of the filter element 1, however, a depression 14 is provided which assists in even more effectively compensating thermal expansion effects, in particular because it is specifically in the central region of the filter element 1 that the greatest thermal loading arises.

Figure 6:
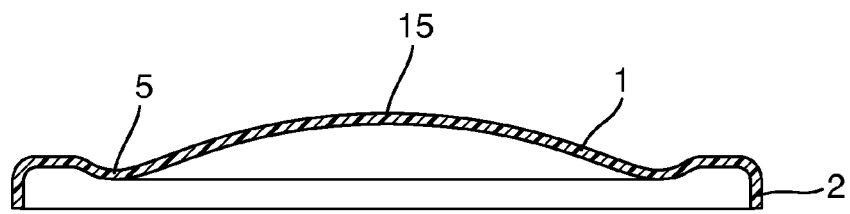

The filter shown in FIG. 6 has a filter element 1 which is of approximately the same form as the filter element 1 from FIG. 1. Only the region of the circumference 2 is designed differently, because in this case no bulge-like ring is provided. This filter element 1 is again approximately in the form of a loudspeaker diaphragm.

Figure 7:
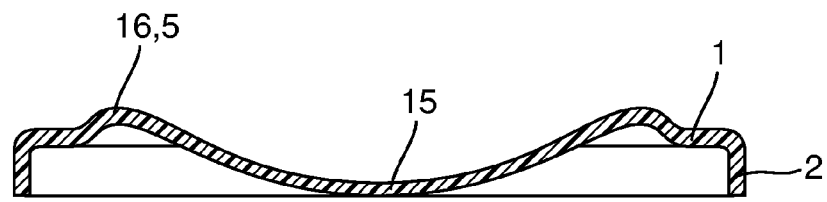

FIG. 7 illustrates a filter element 1 whose inner region 15 is not convexly bulged, like those of FIGS. 1 and 6, but rather is recessed in a concave manner. To attain the configuration according to the invention, in which the filter element 1 intersects a parallel 4a with respect to the filter plane 4 at least four times, the concave inner region 15 of the filter element 1 extends via a convex annular bulge 16, which ultimately merges into the circumference 2 of the filter element 1. This annular bulge 16 compensates length expansion effects under thermomechanical loading.

Figure 8:
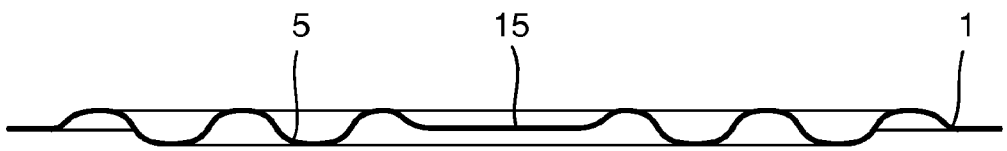
Figure 9:
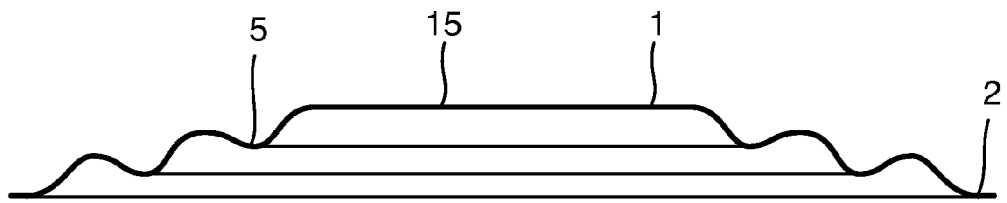

FIGS. 8 and 9 finally show two further exemplary embodiments of a filter element 1 which have in each case a flat inner region 15 and concentric undulations 5. In the case of FIG. 8, the concentric undulations are formed so as to be of identical height, whereas in the case of FIG. 9, asymmetrical undulations are provided, such that the inner region 15 of the filter element 1 is elevated in relation to the circumference 2.

The invention claimed is:

1. A filter arrangement, comprising a self-supporting areal filter element (1), a carrier pipe, and a sleeve, the filter element having a circumference (2) adapted to be fixed directly or indirectly to the carrier pipe to cover a free cross section of the carrier pipe, the circumference (2) of the filter element (1) circumscribes a central filter plane (4), the filter element (1) comprises at least one layer formed of a plastically deformable material and is provided with at least one undulation (5) or bead (13), which does not intersect the circumference (2), such that the filter element (1) intersects the filter plane (4), or a plane (4a) parallel thereto, at least four times within the circumference (2), the filter element (1) is fixed to the carrier pipe (8) and covers a clear internal cross section thereof, the filter element (1) is, at the circumference (2) thereof, bent to form a circumferential region running parallel to an outer wall of the carrier pipe (8), and the sleeve (10) clamps the circumferential region between itself and the carrier pipe (8).

2. The filter arrangement as claimed in claim 1, wherein the at least one undulation (5) or bead (13) extends substantially along a curve parallel with respect to the circumference (2).

3. The filter arrangement as claimed in claim 1, wherein the at least one undulation (5) or bead (13) is comprised of multiple partial segments spaced apart from one another.

4. The filter arrangement as claimed in claim 1, wherein the at least one undulation (5) or bead (13) is of rotationally symmetrical or point-symmetrical form.

5. The filter arrangement as claimed in claim 1, wherein the filter element (1) has multiple concentric undulations (5) or beads (13) with identical or different heights, and centrally, has a flattening or spherical-cap-shaped elevation or depression (14).

6. The filter arrangement as claimed in claim 1, wherein the at least one layer is comprised of heat-resistant high-grade steel.

7. The filter arrangement as claimed in claim 6, wherein the steel is an austenitic high-grade steel.

8. The filter arrangement as claimed in claim 1, wherein the at least one layer is comprised of at least one of a fabric, a fine fabric, a knitted fabric, a fabric with rectangular meshes or square meshes, a knit, a sintered fabric, or of a braided fabric with a filter fineness of at least 500 μm.

9. The filter arrangement as claimed in claim 8, wherein the at least one layer is produced from metal wires which have different wire thicknesses.

10. The filter arrangement as claimed in claim 9, wherein the metal wires include interwoven warp wires and weft wires, and the warp wires are formed so as to be thicker than the weft wires.

11. The filter arrangement as claimed in claim 1, wherein the filter element (1), in the installed state and at a temperature of up to 650° C. withstands a differential pressure without permanent deformation.

12. The filter arrangement as claimed in claim 1, wherein the filter element (1), in the installed state, withstands a maximum force of at least 100 N acting perpendicular to the filter plane (4) over at least two thirds of an overall area of the filter element (1), without rupturing.

13. The filter arrangement as claimed in claim 1, wherein the filter element (1) is compressed between the sleeve (10) and the carrier pipe (8).

14. The filter arrangement as claimed in claim 13, wherein the carrier pipe (8) and the sleeve (10) are provided with at least one aligned outflow opening (11, 12) which is covered by the filter element (1).

15. The filter arrangement as claimed in claim 1, wherein the filter element (1) is provided with an undulation (5) which runs along the circumference (2) and which, within said undulation, has a conical elevation or a spherical cap or a flat base.

* * * * *